T. E. MURRAY.
METHOD OF LOCALIZING THE BUR AT ELECTRICAL BUTT OR EDGE WELDED JOINTS.
APPLICATION FILED FEB. 18, 1916.
1,189,856. Patented July 4, 1916.
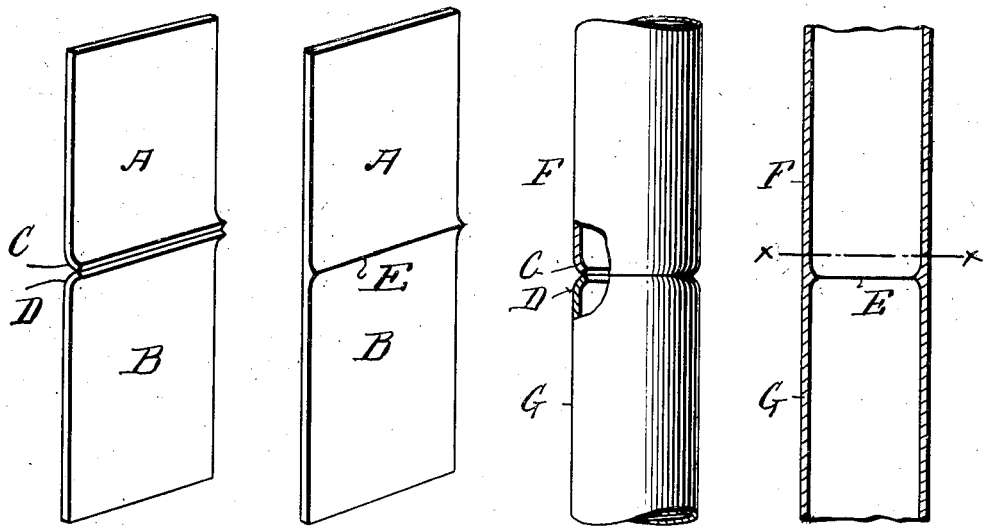
Fig 1. Fig. 2. Fig. 3. Fig. 4.
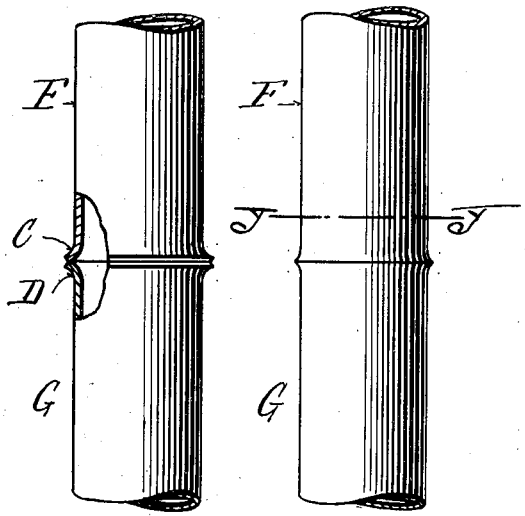
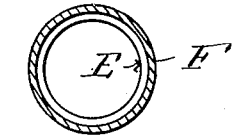
Fig. 5.
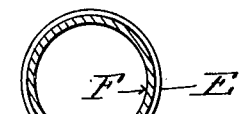
Fig. 8.
Fig. 6. Fig. 7.
Inventor
Thomas E. Murray
By his Attorney
Carl Benjamin

UNITED STATES PATENT OFFICE.

THOMAS E. MURRAY, OF NEW YORK, N. Y.

METHOD OF LOCALIZING THE BUR AT ELECTRICAL BUTT OR EDGE WELDED JOINTS.

1,189,856.   Specification of Letters Patent.   Patented July 4, 1916.

Application filed February 18, 1916. Serial No. 79,052.

*To all whom it may concern:*

Be it known that I, THOMAS E. MURRAY, a citizen of the United States, residing at New York, in the county of New York and State of New York, have invented a certain new and useful Improvement in Methods of Localizing the Bur at Electrical Butt or Edge Welded Joints, of which the following is a specification.

The invention relates to electric welding, and consists in the method, hereinafter set forth, for localizing the bur or ridge of metal extruded at the welded joint between butt or edge-welded bodies to either side of said joint at will.

In the accompanying drawings—Figure 1 represents two plates to be welded at their edges, and arranged for producing the bur on the side shown. Fig. 2 shows said plates after welding. Fig. 3 shows two tubes to be butt-welded, and arranged for producing the bur on the interior of the joint. Fig. 4 is a longitudinal section of said tubes, and Fig. 5 is a section of one of said tubes on the line $x$, $x$ of Fig. 4, after welding. Fig. 6 shows said tubes arranged for producing the bur on the exterior of the joint. Fig. 7 is a longitudinal section of said tubes, and Fig. 8 is a section of one of said tubes on the line $y$, $y$ of Fig. 7.

Similar letters of reference indicate like parts.

A and B, Figs. 1 and 2, are two metal plates to be welded together at their edges. After welding, a bur of metal usually remains at the joint. I localize this bur on either side of said joint at will by bending the edges of the plates toward the side on which the bur is desired. Thus in Fig. 1 the plates are arranged for the production of the bur on the right hand side of the joint. I, therefore, bend the plate edges at C and D to the right. These edges being approximated, as shown in Fig. 1, the welding current is passed, and the plates are pressed together until the metal of said bent over edges C, D is fused and the flat or straight portions of the plates meet at the joint, as shown in Fig. 2. The bur E resulting from the fusion will then appear on the right hand side of the joint. To cause the bur to form on the left hand side, the plate edges C, D are bent over in the opposite direction, and the welding operation done as before.

In butt-welding tubes, as F, G, I produce the bur E on the inside of the joint by inwardly bending the metal of the butt ends of the tubes, as shown at C, D, Fig. 3. The ends being brought together, welding current is passed and pressure applied until, as before, the straight portions of the tubes unite, as shown in Fig. 4. To produce the bur on the outside of the joint, the metal at the butt ends of the tubes is bent outwardly, as shown in Fig. 6, and the welding operation continues, as before, until the straight portions of said tubes become united, as shown in Fig. 7.

It is important in many manufactures involving electric welding to be able to localize the bur. Thus, for example, in uniting pipes for use as fluid conduits it is desirable that they should not be choked by an internal bur at the joint; therefore, the method is applied, as shown in Figs. 6 and 7, to produce the bur on the outside. On the other hand, when tubes are employed structurally, as in metal vehicle wheels, it is desirable to conceal the bur, or to avoid the expense of removing it by mechanical means after production. There the method is applied as shown in Figs. 3 and 4. So also in making boxes or casings of any kind, wherever a smooth interior is required, the bur at the joints will be turned outwardly, and, conversely, when a smooth exterior is desired, the bur will be turned inwardly.

I do not claim herein the method of welding members by, first, forming on the edge of one of them an extension beyond the desired length which said member is to have after welding measured outwardly from the joint and physically determining the inner limit of said extension, and second, placing said extension in contact with the opposite member and subjecting the joint to pressure and a welding current until said extension is fused and said bodies united, since I have described and claimed said method in another application for Letters Patent, Serial No. 81,589, filed March 2, 1916.

I claim:

1. The method of localizing the bur of metal extruded at the joint between two butt or edge-welded bodies, which consists in, first, bending over the edges of said bodies toward the side on which the bur is to be formed, second, placing said bent over edges in contact, and third, maintaining welding current and pressing said bodies together until the metal of said bent over edges is fused and the straight portions of said bodies come together and are united.

2. The method of localizing the bur of metal extruded at the joint between butt-welded tubes, which consists in, first, bending over the circumferential edge of the tubes; second, placing said bent over edges in contact, and third, maintaining welding current and pressing said tubes together until the metal of said bent over edges is fused and the straight portions of said tubes come together and are united.

In testimony whereof I have affixed my signature in presence of two witnesses.

THOMAS E. MURRAY.

Witnesses:
GERTRUDE T. PORTER,
MAY T. McGARRY.